(12) United States Patent
Salubro et al.

(10) Patent No.: US 12,586,742 B2
(45) Date of Patent: Mar. 24, 2026

(54) CONDUCTOR LATCH FOR IN-LINE DISCONNECT SWITCH

(71) Applicant: Hubbell Incorporated, Shelton, CT (US)

(72) Inventors: Sigfrido Salubro, West Lebanon, NH (US); Prakashpathy Janikaraman, Choolaimedu (IN)

(73) Assignee: Hubbell Incorporated, Shelton, CT (US)

( * ) Notice: Subject to any disclaimer, the term of this patent is extended or adjusted under 35 U.S.C. 154(b) by 950 days.

(21) Appl. No.: 17/786,074

(22) PCT Filed: Dec. 14, 2020

(86) PCT No.: PCT/US2020/064872
§ 371 (c)(1),
(2) Date: Jun. 16, 2022

(87) PCT Pub. No.: WO2021/126771
PCT Pub. Date: Jun. 24, 2021

(65) Prior Publication Data
US 2023/0022622 A1    Jan. 26, 2023

Related U.S. Application Data

(60) Provisional application No. 62/949,621, filed on Dec. 18, 2019.

(51) Int. Cl.
*H01H 31/26* (2006.01)
*H01B 17/06* (2006.01)
(Continued)

(52) U.S. Cl.
CPC .............. *H01H 31/26* (2013.01); *H01B 17/06* (2013.01); *H02G 1/02* (2013.01); *H01H 31/006* (2013.01)

(58) Field of Classification Search
CPC ...... H01H 31/26; H01H 31/006; H01H 31/28; H02G 7/00; H02G 1/02; H01B 17/06
(Continued)

(56) References Cited

U.S. PATENT DOCUMENTS 3,670,372 A    6/1972  Crosby
3,813,504 A    5/1974  Anderson
(Continued)

FOREIGN PATENT DOCUMENTS

CA    2654895    1/2008
CA    2671582    5/2017

OTHER PUBLICATIONS

Burndy Brochure "Bolted Wedge In-Line Disconnect SW", 2016 (1 page).
(Continued)

*Primary Examiner* — Timothy J Thompson
*Assistant Examiner* — Michael F McAllister
(74) *Attorney, Agent, or Firm* — Wissing Miller LLP

(57) ABSTRACT

An in-line power disconnect assembly for electrical power distribution systems is provided. The in-line power disconnect assembly includes a first end section, a second end section, at least one insulator positioned between the first end section and the second end section, and a switch assembly positioned between the first end section and the second end section. Each of the first and second end sections include a conductor clamp that can be rotated or twisted relative to a longitudinal axis of the first or second end section between a clamping position and an open position.

20 Claims, 14 Drawing Sheets

(51) Int. Cl.
 *H02G 1/02* (2006.01)
 *H01H 31/00* (2006.01)

(58) Field of Classification Search
 USPC ........................................................ 174/40 R
 See application file for complete search history.

(56) References Cited

U.S. PATENT DOCUMENTS

| | | | | |
|---|---|---|---|---|
| 3,876,849 | A | 4/1975 | Jackson, Jr. | |
| 4,183,686 | A | 1/1980 | De France | |
| 4,814,550 | A | 3/1989 | Newberg | |
| 5,539,961 | A | 7/1996 | DeFrance | |
| 5,581,051 | A | 12/1996 | Hill | |
| 5,942,723 | A | 8/1999 | Laricchia | |
| 7,498,528 | B2 | 3/2009 | De France | |
| 7,534,976 | B2 | 5/2009 | Crutcher | |
| 7,766,702 | B2 | 8/2010 | De France | |
| 7,943,871 | B2 | 5/2011 | Crutcher | |
| 8,143,546 | B2 * | 3/2012 | De France | H01H 31/28 |
| | | | | 200/554 |
| 8,198,558 | B2 * | 6/2012 | Gregory | H01H 31/28 |
| | | | | 439/783 |
| 9,876,348 | B2 * | 1/2018 | Rahman | H01R 43/20 |
| 2007/0295691 | A1 | 12/2007 | Crutcher | |
| 2008/0026600 | A1 | 1/2008 | De France | |
| 2008/0026644 | A1 | 1/2008 | De France | |
| 2010/0155212 | A1 * | 6/2010 | Mitchell | H01H 31/00 |
| | | | | 200/48 KB |
| 2010/0314232 | A1 * | 12/2010 | Gregory | H01H 11/00 |
| | | | | 29/874 |
| 2014/0083831 | A1 * | 3/2014 | Gregory | H01R 4/50 |
| | | | | 200/48 R |
| 2016/0072277 | A1 * | 3/2016 | Rahman | H02H 3/08 |
| | | | | 361/102 |

OTHER PUBLICATIONS

Burndy Instructions Sheet, "WADM In-Line SW" 2016 (1 page).
TE Connectivity Disconnect SW Brochure May 2012 (2 pages).
International Preliminary Report on Patentability mailed in corresponding PCT/US2020/064872 on Jun. 30, 2022 (9 pages).
Search Report and Written Opinion mailed in corresponding PCT/US20/64872 on Mar. 11, 2021 (14 pages).
First Office Action in corresponding Mexican Application No. MX/a/2022/007422 mailed Sep. 24, 2025. (21 pages).

* cited by examiner

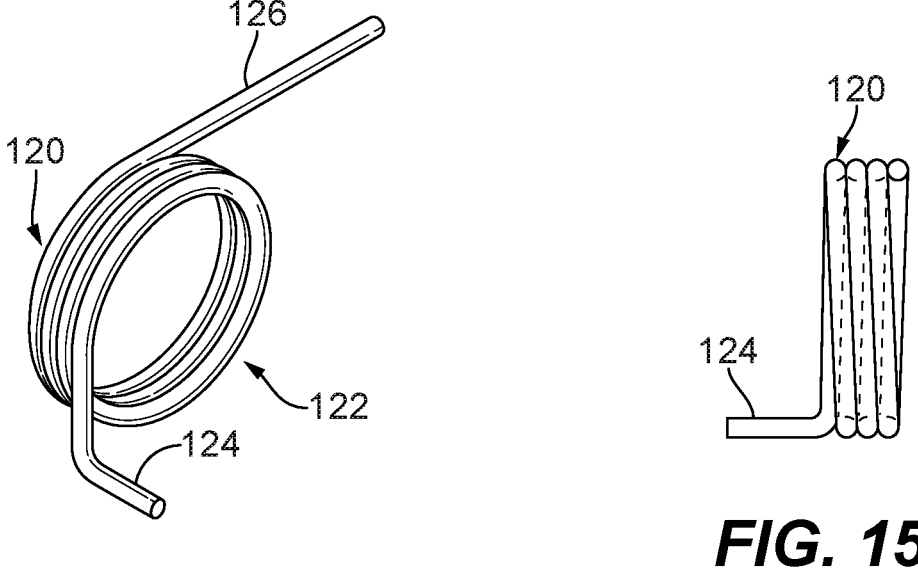
126
120
122
124
FIG. 14
120
124
FIG. 15
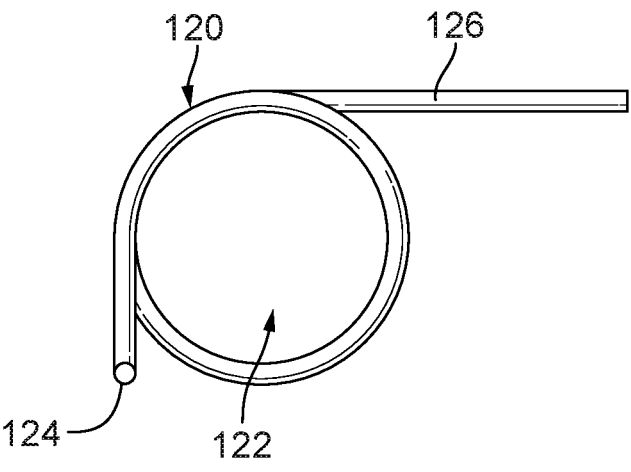
120          126
124          122
FIG. 16

CONDUCTOR LATCH FOR IN-LINE DISCONNECT SWITCH

CROSS REFERENCE TO RELATED APPLICATIONS

This application is a 371 of PCT/US2020/064872 filed on Dec. 14, 2020, published on Jun. 24, 2021 under publication number WO 2021/126771 A1, which claims priority benefits from U.S. Provisional Application No. 62/949,621 filed on Dec. 18, 2019, both of which are incorporated herein in their entirety by reference.

BACKGROUND

Field

The present disclosure relates generally to in-line disconnect switches used to connect and disconnect electrical power in power distribution systems. More particularly, the present disclosure relates to in-line disconnect switches that incorporate a conductor clamp that swings or twists between a clamping position and an open position.

Description of the Related Art

In the electrical distribution industry, it is sometimes useful to disconnect the electrical current from load side electrical conductors. Often, utility lineman disconnect the electrical current at the utility pole. However, disconnecting the electrical current can be accomplished on the line by utilizing an in-line disconnect switch.

An in-line disconnect switch generally comprises two mechanical clamp assemblies, one or more insulators between the mechanical clamp assemblies and a mechanical switch used to disconnect the electrical current. With in-line disconnect switches, the electrical conductor is first mechanically connected to each clamp assembly and then the electrical conductor is cut at a point between the clamp assemblies. The mechanical switch may be a knife switch having two ends, with one end fastened to one clamp assembly and the other end fastened to the other clamp assembly. The knife switch creates an electrically conductive path between each cut end of the cut electrical conductor. When closed the knife switch allows current to flow from one cut end of the electrical conductor to the other cut end of the electrical conductor. When opened the knife switch breaks the electrically conductive path between each cut end of the electrical conductor stopping the flow of the current to the load. Conventional in-line disconnect switches typically include a conductor connection that often necessitates utility lineman intervention when installing the in-line disconnect switch. Accordingly, there is a need to provide an in-line disconnect switch that reduces the components needed for a conductor connection and that aligns motion of the conductor connection with the motion of installing the disconnect switch using an extendable reach tool, such as a hot stick.

SUMMARY

The present disclosure provides exemplary embodiments of electrical disconnect assemblies. In one embodiment, the electrical disconnect assembly includes a first end section, a second end section, at least one insulator and a switch assembly. The first end section has a first conductor channel and a first conductor clamp that is rotatably movable between a clamping position and an open position. When the first conductor clamp is in the clamping position, a first clamp arm of the first conductor clamp is aligned with the first conductor channel so that a first conductor engaging surface of the first clamp arm is positioned to engage a conductor within the first conductor channel. The second end section has a second conductor channel and a second conductor clamp that is rotatably movable between a clamping position and an open position. When the second conductor clamp is in the clamping position, a second clamp arm of the second conductor clamp is aligned with the second conductor channel so that a second conductor engaging surface of the second clamp arm is positioned to engage a conductor within the second conductor channel. The at least one insulator is positioned between the first end section and the second end section. The switch assembly is positioned between the first end section and the second end section. The at least one insulator and the switch assembly are in parallel electrically.

In another embodiment, the electrical disconnect assembly includes a first end section, a second end section, at least one insulator and a switch assembly. The first end section has a first conductor channel and a first conductor clamp that is rotatable between a clamping position and an open position. When the first conductor clamp is in the clamping position a clamp arm of the first conductor clamp is substantially perpendicular to a longitudinal axis of the first end section, and a conductor engaging surface of the clamp arm of the first conductor clamp is positioned to engage an electrical conductor within the first conductor channel. The second end section has a second conductor channel and a second conductor clamp that is rotatable between a clamping position and an open position. When the second conductor clamp is in the clamping position a clamp arm of the second conductor clamp is substantially perpendicular to a longitudinal axis of the second end section, and a conductor engaging surface of the clamp arm of the second conductor clamp is positioned to engage an electrical conductor within the second conductor channel. The at least one insulator is positioned between the first end section and the second end section, and switch assembly is positioned between the first end section and the second end section. The at least one insulator and the switch assembly are in parallel electrically.

The first conductor clamp includes a body and a biasing member. The body has a pivot arm and the clamp arm of the first conductor clamp that is coupled to the pivot arm. The pivot arm is a substantially cylindrical member at least where the clamp arm of the first conductor clamp couples to the pivot arm. The clamp arm of the first conductor clamp extends from the pivot arm and includes the conductor engaging surface configured to engage the electrical conductor within the first conductor channel. In an exemplary embodiment, the clamp arm of the first conductor clamp includes a conductor guide, e.g., a camming surface, configured to move the body of the first conductor clamp from the clamping position to the open position in opposition to the normal biasing force of the biasing member of the first conductor clamp. The biasing member is coupled to either the pivot arm or the clamp arm of the first conductor clamp and the first side section. The biasing member is configured to normally bias the body of the first conductor clamp to the clamping position.

The second conductor clamp includes a body and a biasing member. The body has a pivot arm and the clamp arm of the second conductor clamp coupled to the pivot arm. The pivot arm is a substantially cylindrical member at least where the clamp arm of the second conductor clamp couples to the pivot arm. The clamp arm of the second conductor clamp extends from the pivot arm and includes the conductor engaging surface configured to engage the electrical conductor within the second conductor channel. The clamp arm of the second conductor clamp includes a conductor guide, e.g., a camming surface, configured to move the body of the second conductor clamp from the clamping position to the open position in opposition to the normal biasing force of the biasing member of the second conductor clamp. The biasing member is coupled to either the pivot arm or the clamp arm of the second conductor clamp and the second side section. The biasing member is configured to normally bias the body of the second conductor clamp to the clamping position.

In another embodiment, the electrical disconnect assembly includes a first end section, a second end section and an intermediate section positioned between the first end section and the second end section. The first end section has a first conductor channel. A first conductor clamp is attached to the first end section and is rotatably movable between a clamping position and an open position. When the first conductor clamp is in the clamping position a clamp arm of the first conductor clamp is aligned with the first conductor channel so that a conductor engaging surface of the clamp arm of the first conductor clamp is positioned to engage a conductor within the first conductor channel. The second end section has a second conductor channel. A second conductor clamp attached to the second end section and is rotatably movable between a clamping position and an open position. When the second conductor clamp is in the clamping position a clamp arm of the second conductor clamp is aligned with the second conductor channel so that a second conductor engaging surface of the clamp arm of the second conductor clamp is positioned to engage a conductor within the second conductor channel. The intermediate section includes at least one insulator having a first end coupled to the first end section and a second end coupled to the second end section, and a switch assembly having a first end coupled to the first end section and a second end coupled to the second end section. The at least one insulator and the switch assembly are in parallel electrically.

The first conductor clamp includes a body and a biasing member. The body has a pivot arm and the clamp arm of the first conductor clamp coupled to the pivot arm. The pivot arm is a substantially cylindrical member at least where the clamp arm of the first conductor clamp couples to the pivot arm. The clamp arm of the first conductor clamp extends from the pivot arm of the first conductor clamp and includes the conductor engaging surface configured to engage the electrical conductor within the first conductor channel. The clamp arm of the first conductor clamp includes a conductor guide, e.g., a camming surface, that is configured to move the body of the first conductor clamp from the clamping position to the open position in opposition to the normal biasing force of the biasing member of the first conductor clamp. The biasing member is coupled to either the pivot arm or the clamp arm of the first conductor clamp and the first side section. The biasing member is configured to normally bias the body of the first conductor clamp to the clamping position.

The second conductor clamp includes a body and a biasing member. The body has a pivot arm and the clamp arm of the second conductor clamp is coupled to the pivot arm. The pivot arm is a substantially cylindrical member at least where the clamp arm of the second conductor clamp couples to the pivot arm. The clamp arm of the second conductor clamp extends from the pivot arm and includes the conductor engaging surface configured to engage the electrical conductor within the second conductor channel. The clamp arm of the second conductor clamp includes a conductor guide, e.g., a camming surface, configured to move the body of the second conductor clamp from the clamping position to the open position in opposition to the normal biasing force of the biasing member of the second conductor clamp. The biasing member is coupled to either the pivot arm or the clamp arm of the second conductor clamp and the second side section. The biasing member is configured to normally bias the body of the second conductor clamp to the clamping position.

The present disclosure also provides exemplary embodiments of conductor clamps. In one embodiment, the conductor clamp includes a body and a biasing member. The body has a pivot arm and a clamp arm. The pivot arm is a substantially cylindrical member. The clamp arm extends from the pivot arm and includes a conductor engaging surface configured to engage an electrical conductor. The biasing member is coupled to either the clamp arm or the pivot arm.

In another embodiment, the conductor clamp includes a body and a biasing member. The body has a pivot arm and the clamp arm coupled to the pivot arm. The pivot arm is a substantially cylindrical member at least where the clamp arm couples to the pivot arm. The clamp arm extends from the pivot arm and includes the conductor engaging surface configured to engage the electrical conductor when the electrical conductor is positioned within a conductor channel of the electrical disconnect assembly. The clamp arm includes a conductor guide, e.g., a camming surface, that when a force is applied to the conductor guide the body moves from the clamping position to the open position in opposition to the normal biasing force of the biasing member. The biasing member coupled to either the pivot arm or the clamp arm and configured to be coupled to the electrical disconnect assembly so that the biasing member normally bias the body to the clamping position.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 14 is a side perspective view of an exemplary embodiment of a biasing member of the conductor clamp of FIG. 7;

FIG. 15 is an end elevation view of the biasing member of FIG. 14;

FIG. 16 is a side elevation view of the biasing member of FIG. 14;

DETAILED DESCRIPTION

The following exemplary embodiments are set forth to aid in an understanding of the subject matter of this disclosure but are not intended and may not be construed to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner. For ease of description, the in-line power disconnect assemblies according to the present disclosure may also be referred to herein as the "disconnect assemblies" in the plural and the "disconnect assembly" in the singular. The electrical conductors according to the present disclosure may also be referred to herein as the "conductors" in the plural and the "conductor" in the singular.

Figure 1:
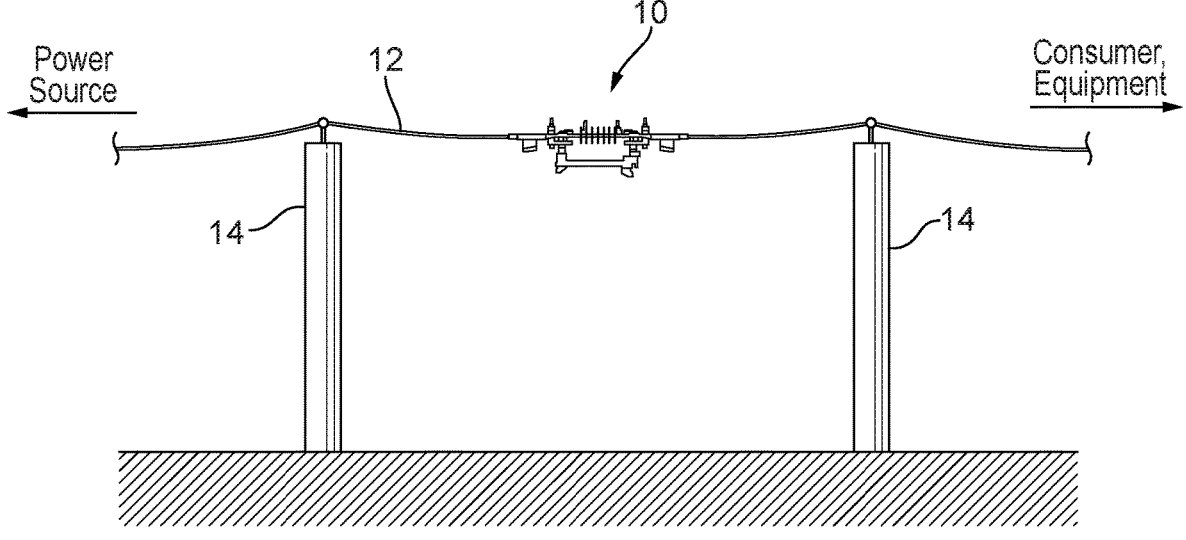
FIG. 1 is side elevation view of a portion of a power distribution system illustrating an electrical conductor extending between two utility poles and an in-line power disconnect assembly according to the present disclosure connected to the electrical conductor at a point between the utility poles.

Exemplary embodiments of disconnect assemblies according to the present disclosure are shown and described. As shown in FIG. 1, a disconnect assembly 10 according to the present disclosure is configured and dimensioned to be attached to a conductor 12 spanning two utility poles 14 using an extendable reach tool, such as a hot stick (not shown) or by a utility linesman by hand. The disconnect assemblies 10 contemplated by the present disclosure include, but are not limited to, switches, e.g., knife switches.

Referring to FIGS. 2-6, an exemplary embodiment of the disconnect assembly 10 is shown. The disconnect assembly 10 generally comprises a first end section 20, a second end section 40, and an intermediate section 60 between the first end section 20 and the second end section 40. The first end section 20 is configured and dimensioned to receive a portion of a conductor, e.g., conductor 300 seen in FIG. 17 or conductor 350 seen in FIG. 24, and to mechanically connect or secure the portion of the conductor to the first end section 20. The second end section 40 is configured and dimensioned to receive a portion of the conductor, e.g., conductor 300 or 350, and to mechanically connect or secure the portion of the conductor 300 or 350 to the second end section 40. It is noted that once the conductor, e.g., conductor 300 or 350, is first connected, e.g., mechanically connected, to the first end section 20 and the second end section 40, the conductor is cut at a point between the first end section 20 and the second end section 40. For ease of description, the cut conductor mechanically connected to the first end section 20 may also be referred to the first end conductor, and the cut conductor mechanically connected to the second end section 40 may also be referred to the second end conductor. The switch assembly 64, described in more detail below, in the intermediate section 60 then makes or breaks an electrically conductive path between the first end conductor and the second end conductor.

Figure 2:
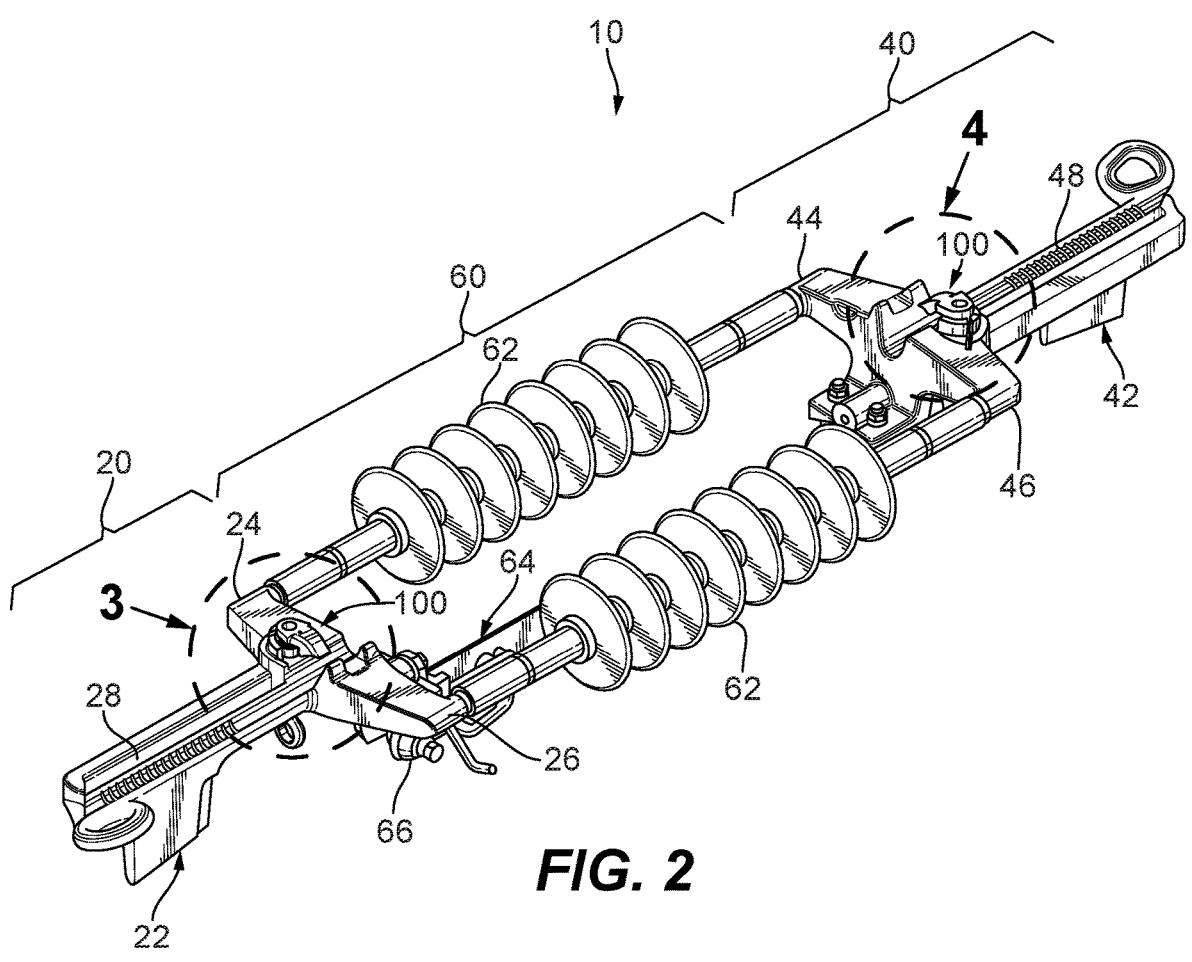
FIG. 2 is a perspective view of an exemplary embodiment of the in-line power disconnect assembly according to the present disclosure, illustrating first and second end section, a pair of insulators between the pair of end sections and a switch assembly between the pair of end sections.
Figure 5:
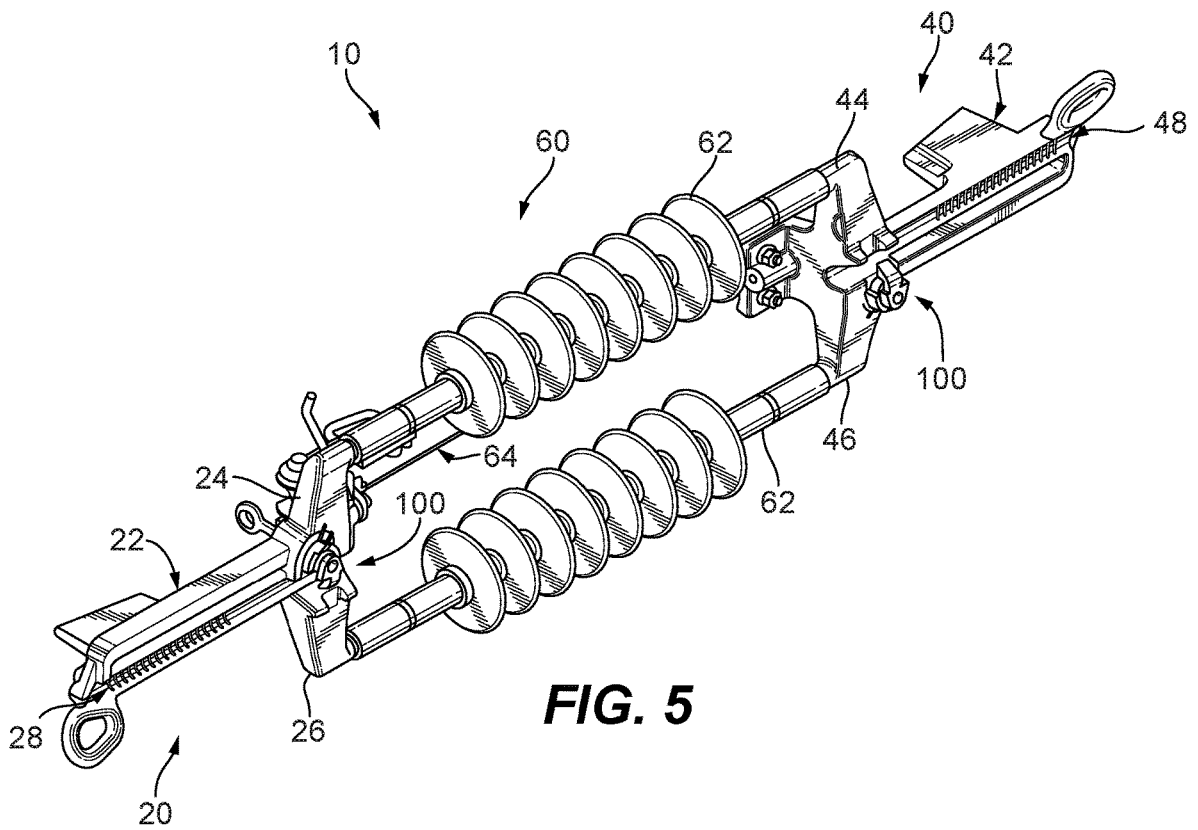
FIG. 5 is another perspective view of the in-line power disconnect assembly of FIG. 2.
Figure 6:
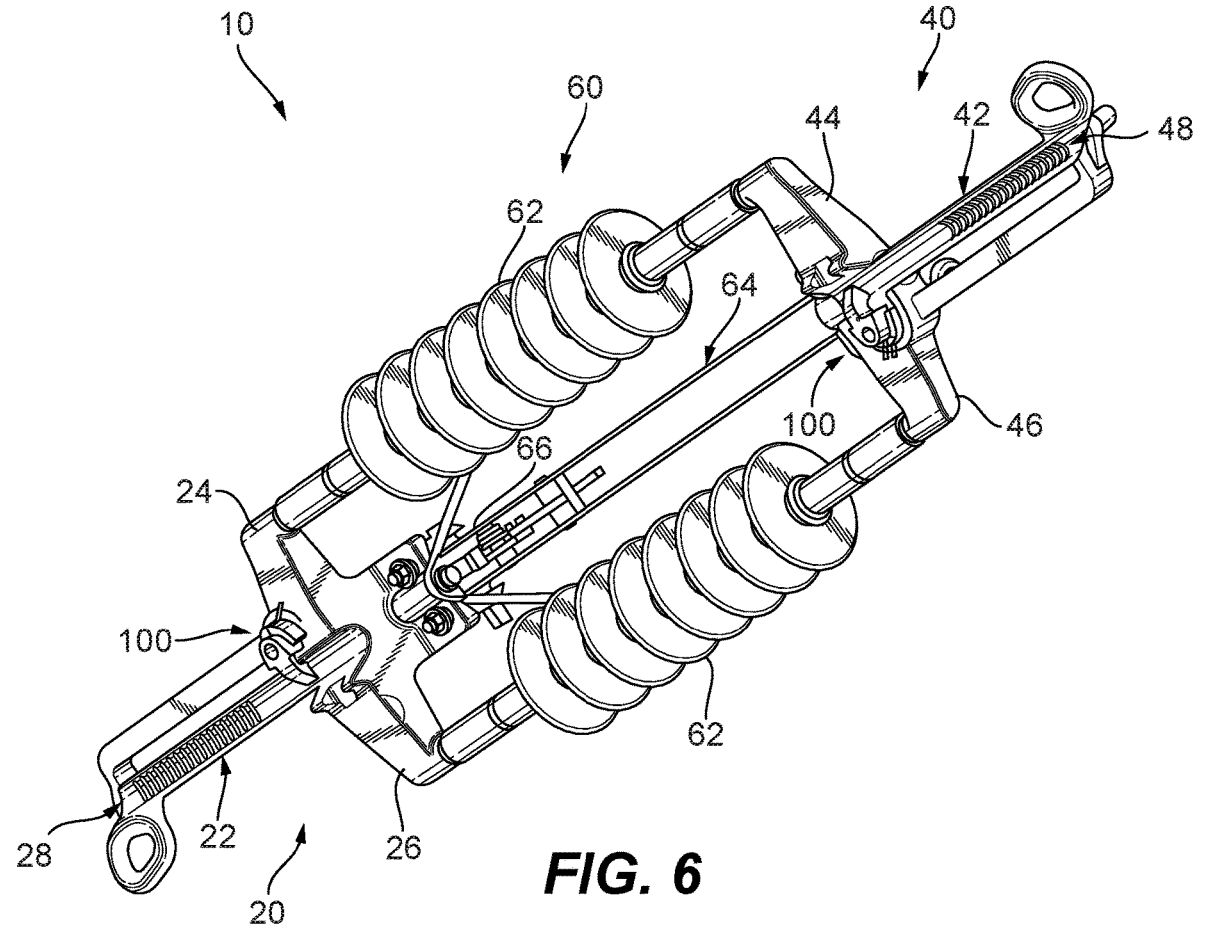
FIG. 6 is another perspective view of the in-line power disconnect assembly of FIG. 2.

In the exemplary embodiment shown in FIGS. 2, 5 and 6, the first end section 20 is a clamp assembly having a body 22, a first arm 24 extending from the body 22 and a second arm 26 extending from the body 22. The body 22 has a conductor channel 28 that extends along a longitudinal axis of the body 22 as shown. The conductor channel 28 is provided to receive a portion of a conductor, e.g., conductor 300 or 350, and to align the conductor with a conductor clamp 100 used to mechanically connect the conductor to the first end section 20. While the embodiment shown has the conductor clamp 100 as part of the body 22, the conductor clamp 100 may be part of the first arm 24 or the second arm 26. The body 22 may be a one piece member or multi-piece member secured together using, for example, mechanical fasteners, adhesives or welds. The body 22 may be made of a metallic material that can withstand outdoor environmental conditions. As non-limiting examples, the body 22 may be made of aluminum alloys, stainless steel, galvanized steel, copper alloys or bronze alloys. The first arm 24 may extend substantially perpendicular to the body 22 or the first arm may extend at an angle relative to the body 22. Similarly, the second arm 24 may extend substantially perpendicular to the body 22 or the second arm 24 may extend at an angle relative to the body 22. In the exemplary embodiment shown, the first arm 24 extends away from the body 22 so that it is substantially perpendicular to the body 22, and the second arm 26 extends away from the body 22 so that it is substantially perpendicular to the body 22.

Continuing to refer to the exemplary embodiment of FIGS. 2, 5 and 6, the second end section 40 is a clamp assembly having a body 42, a first arm 44 extending from the body 42 and a second arm 46 extending from the body 42. The body 42 has a conductor channel 48 that extends along a longitudinal axis of the body 42 as shown. The conductor channel 48 is provided to receive a portion of a conductor, e.g., conductor 300 or 350, and to align the conductor with a conductor clamp 100 used to mechanically connect the conductor to the second end section 40. While the embodiment shown has the conductor clamp 100 as part of the body 42, the conductor clamp 100 may be part of the first arm 44 or the second arm 46. The body 42 may be a one piece member or multi-piece member secured together using, for example, mechanical fasteners, adhesives or welds. The body 42 may be made of a metallic material that can withstand outdoor environmental conditions. As non-limiting examples, the body 42 may be made of aluminum alloys, stainless steel, galvanized steel, copper alloys or bronze alloys. The first arm 44 may extend substantially perpendicular to the body 42 or the first arm may extend at an angle relative to the body 42. Similarly, the second arm 46 may extend substantially perpendicular to the body 42 or the second arm 46 may extend at an angle relative to the body 42. In the exemplary embodiment shown, the first arm 44 extends away from the body 42 so that it is substantially perpendicular to the body 42, and the second arm 46 extends away from the body 42 so that it is substantially perpendicular to the body 42.

The intermediate section 60 includes one or more electrical insulators 62 and a switch assembly 64. The one or more electrical insulators 62 may include composite insulators or porcelain insulators. In the exemplary embodiment shown, a first insulator 62 has one end connected to the first arm 24 of the first end section 20 and another end connected to the first arm 44 of the second end section 40. A second insulator 62 has one end connected to the second arm 26 of the first end section 20 and another end connected to the second arm 46 of the second end section 40. The switch assembly 64 may be any high voltage disconnect capable of making and breaking an electrically conductive path. The switch assembly 64 provides an electrically conductive path between the first end conductor and the second end conductor. As non-limiting examples, the switch assembly 44 may be a knife switch. In the exemplary embodiment shown, the switch assembly 64 is a knife switch having a contact arm 66, seen in FIGS. 2 and 6, that is movable between a closed position and an open position. In the closed position, an electrically conductive path is formed between the first end conductor and the second end conductor. In the open position, the electrically conductive path between the first end conductor and the second end conductor is broken. Thus, the switch assembly 64 can selectively electrically connect the first end conductor to the second end conductor, and electrically disconnect the first end conductor from the second end conductor. In other words, when the switch assembly 64 is in the open position, the load side of the switch assembly 64, e.g., the customer equipment side of the power line seen in FIG. 1, is disconnected from the power source.

A more detailed description of an exemplary embodiment of a disconnect assembly 10 is described in commonly owned U.S. Pat. No. 8,143,546, the contents of which are incorporated herein in their entirety by reference.

Figures 3, 3A, 4:
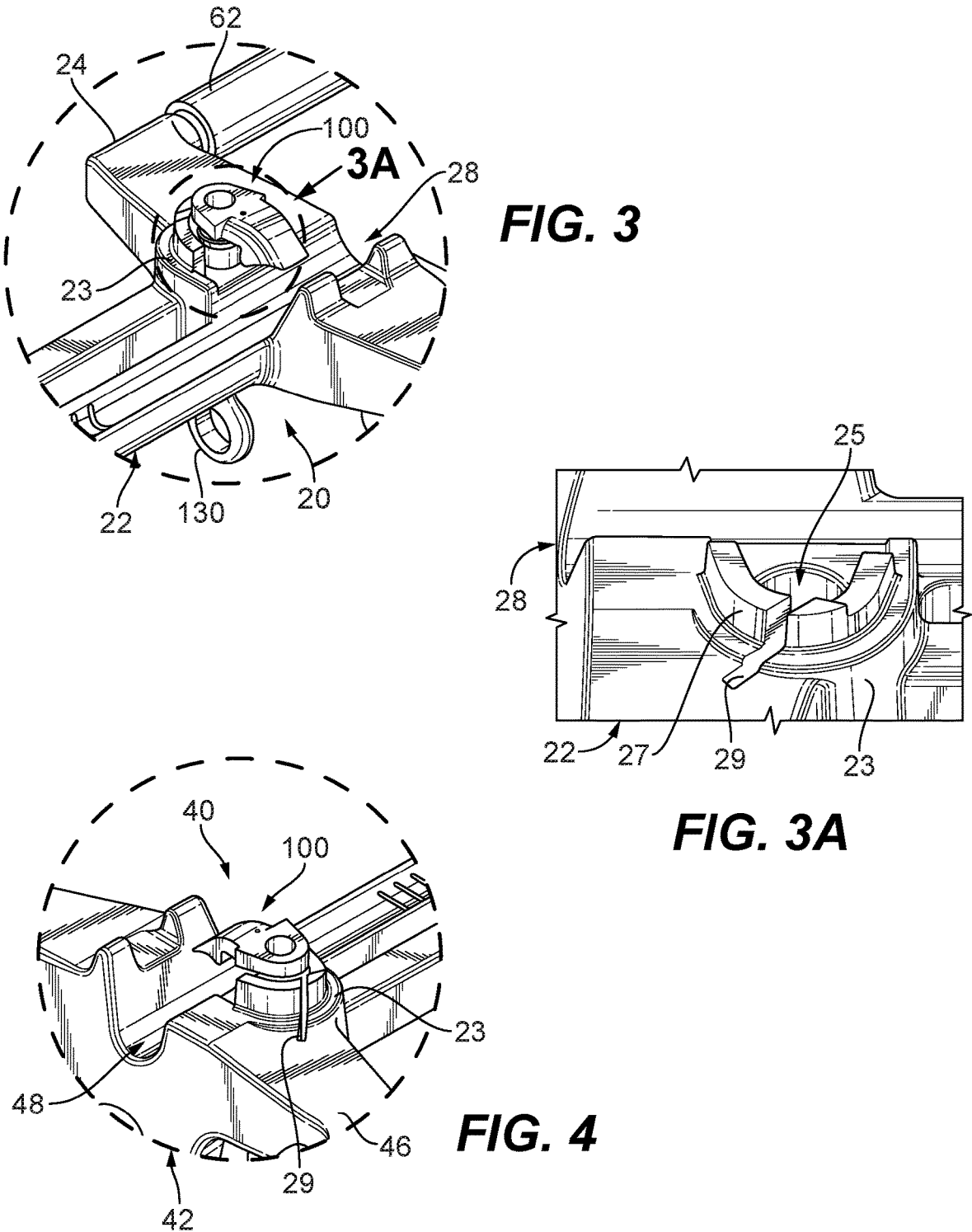
FIG. 3 is an enlarged perspective view of a portion of the first end section of FIG. 2 taken from detail 3, illustrating an exemplary embodiment of a first conductor clamp according to the present disclosure secured to the first end section.
FIG. 3A is an enlarged perspective view of a portion of a body of the first end section of FIG. 3 taken from detail 3A with the conductor clamp removed and illustrating a yoke of the body for receiving the conductor clamp.
FIG. 4 is an enlarged perspective view of a portion of the second end section of FIG. 2 taken from detail 4, illustrating a second conductor clamp secured to the second end section.

Referring now to FIGS. 7-16, an exemplary embodiment of the conductor clamp 100 according to the present disclosure is shown. In this exemplary embodiment, the conductor clamp 100 includes a body 102 and a biasing member 120 coupled to the body 102. The body 102 includes pivot arm 104 and a clamp arm 106. The body 102 may be a one-piece or monolithically formed body where the pivot arm 104 and clamp arm 106 are monolithically formed. In another exemplary embodiment the body 102 may be a multi-piece body where the pivot arm 104 and clamp arm 106 are separate members joined together using welds, adhesives or mechanical fasteners. In the exemplary embodiment shown, the body 102 is a one-piece body. The pivot arm 104 is configured and dimensioned to fit within a yoke in the body 22 of the first end section 20 and in the body 42 of the second end section 40. For ease of description, the yoke 23, seen in FIG. 3A, will be described for the body 22 of the first end section 20. Once skilled in the art would readily appreciate that the yoke 23 in the second end section 40 is the same. Referring to FIG. 3A, the yoke 23 includes a bore 25 in which a lower portion 104*a* of the pivot arm 104 is inserted into. In the exemplary embodiment shown, the pivot arm 104 is a cylindrical member having a threaded bore 108 configured and dimensioned to receive a threaded portion of a stem 130, seen in FIG. 22, used to secure the conductor clamp 100 to the first end section 20 and used to secure the conductor, e.g., conductor 300 or 350, to the first end section 20. An upper portion 104*b* of the pivot arm 104 includes a retainer lip 110 used to hold the biasing member 120 in position on the pivot arm 104 as described in more detail below. A first leg 112 of the clamp arm 106 is formed at an upper portion 104*b* of the pivot arm 104 and a second leg 114 of the clamp arm 106 extends from the first leg 110 in a direction away from the pivot arm 104, as shown. The second leg 114 of the clamp arm 106 has a first portion 114*a* extending from the first leg 112 and a second portion 114*b* extending from the first portion 114*a*. The first portion 114*a* has a bottom surface 114*c* that is substantially perpendicular to the pivot arm 104 and is substantially flat. The second portion 114*b* extends from the first portion 114*a* at an angle so that a conductor engaging surface 114*d* in the second portion 114*b* is spaced a distance "D" from the bottom surface 114*c* of the first portion 114, seen in FIG. 12. The conductor engaging surface 114*d* is preferably a grooved surface that can at least partially follow the contour of the outer diameter of the conductor, e.g., conductor 300 or 350, when installed. The distance "D" is defined by a wall 114*e* of the second portion 114*b* that creates a gap "G" between the pivot arm 104 and the wall 114*e*, seen in FIG. 13. This gap "G" is sufficient to avoid a wall 27 of the yoke 23, seen in FIG. 3A, during installation of a conductor, e.g., conductor 300 or 350.

Figures 7, 8, 9:
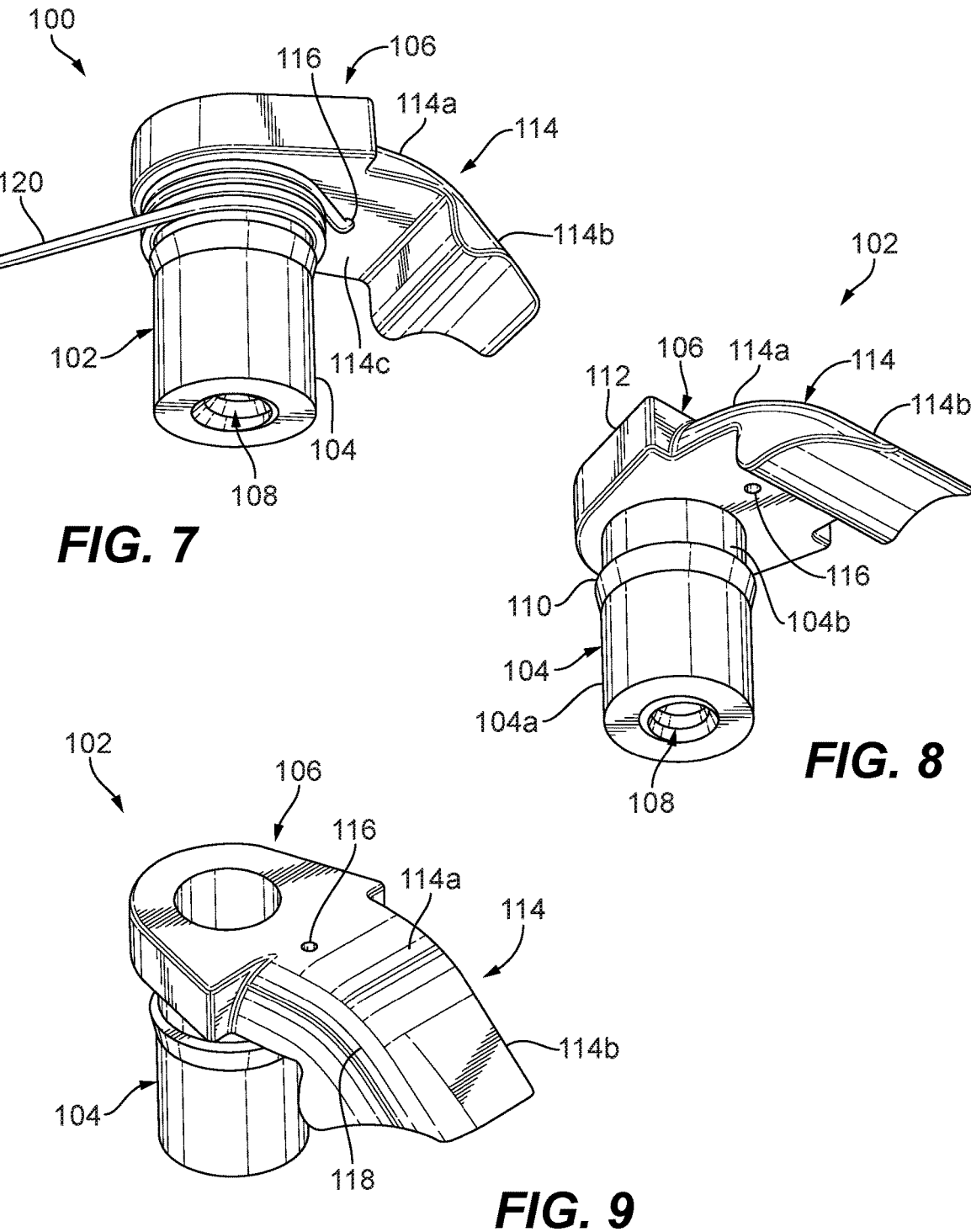
FIG. 7 is a bottom side perspective view of an exemplary embodiment of the conductor clamp according to the present disclosure.
FIG. 8 is a bottom front perspective view of the body of the conductor clamp of FIG. 7.
FIG. 9 is a top side perspective view of the body of the conductor clamp of FIG. 7.
Figures 10, 11, 12, 13:
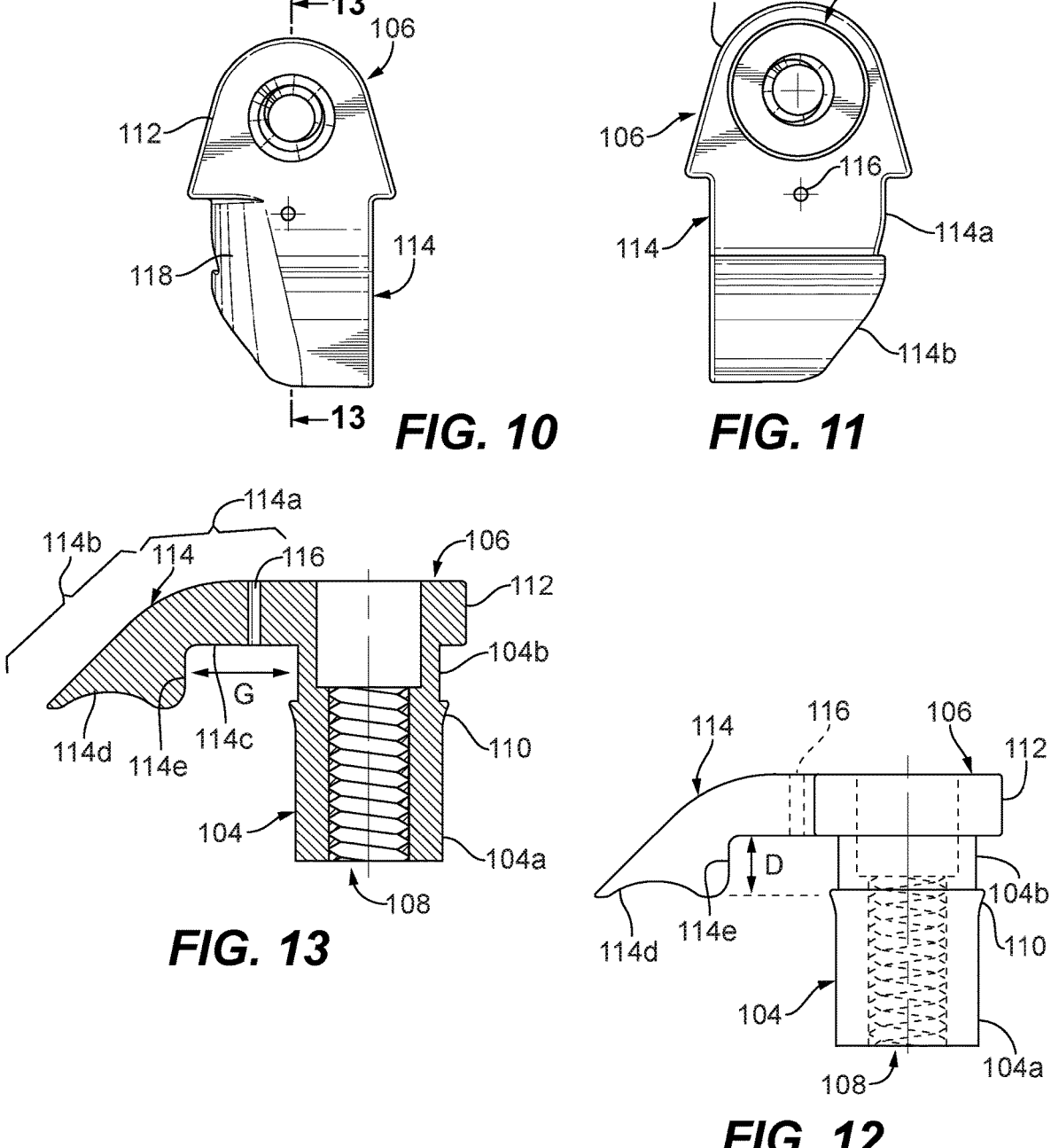
FIG. 10 is a top plan view of the body of the conductor clamp of FIG. 7.
FIG. 11 is a bottom plan view of the body of the conductor clamp of FIG. 7.
FIG. 12 is a side elevation view of the body of the conductor clamp of FIG. 7.
FIG. 13 is a cross-sectional view of the conductor clamp of FIG. 10 taken from line 13-13.

Referring to FIGS. 9 and 10, one side of the second leg 114 includes a conductor guide 118, which in this exemplary embodiment is a radius or rounded edge that is used to guide a conductor, e.g., conductor 300 or 350, into the conductor channel 28 of the first end section 20 or the conductor channel 48 of the second end section 40. The conductor guide, e.g., the rounded edge 118, is also a camming surface configured to twist, pivot or rotate the body 102 from a clamping position to an open position in opposition to the normal biasing force of the biasing member 120 described below. In the clamping position, the second portion 114*b* of the second leg 114 is aligned with or extends over or across the conductor channel 28 or 48 in the respective body 22 or 42 so that the conductor engaging surface 114*d*, seen in FIG. 13, can engage the conductor and so that the second clamp portion 114*b* blocks the conductor, e.g., conductor 300 or 350, within the conductor channel 28 or 48 from exiting the conductor channel. The open position may vary depending upon the size of the conductor, e.g., conductor 300 or 350, to which the disconnect assembly 10 is being attached. More specifically, if the disconnect assembly 10 is being connected to a small conductor, e.g., a I/O AWG conductor, the open position is sufficient to permit the small conductor to pass into the conductor channel 28 or 48, as seen in FIGS. 17-22. If the disconnect assembly 10 is being connected to a large conductor, e.g., a 795 AWG conductor, the open position is sufficient to permit the large conductor to pass into the conductor channel 28 or 48, as seen in FIGS. 23-28.

Referring now to FIGS. 7 and 13-16, an exemplary embodiment of a biasing member 120 is shown. The biasing member 120 in this exemplary embodiment is a torsion spring having a central opening 122, a bent end 124 and a straight end 126. The central opening 122 is configured and dimensioned to fit around the upper portion 104b of the pivot arm 104 as shown in FIG. 7. The bent end 124 of the spring 120 is configured and dimensioned to fit within a hole 116 in the clamp arm 106, and the straight end 126 of the spring 120 is configured and dimensioned to fit within a slot 29 in the yoke 23, seen in FIGS. 3A and 4. The biasing member 120 is provided to normally bias the body 102 of the conductor clamp 100 to the clamping position by normally twisting, pivoting or rotating the body 102 toward the clamping position.

Referring now to FIGS. 17-22, to firmly secure a conductor, e.g., conductor 300 or 350, to the disconnect assembly 10, a stem 130 is coupled to the conductor clamp 100. The stem 130 is preferably an eye-stem that has a shaft 132 that is at least partially threaded, a tool mounting member 134 at an end of the shaft 132, and a collar 136. The threaded portion of the shaft 132 is configured and dimensioned to be threaded into the threaded bore 108 in the pivot arm 104. Coupling the threaded portion of the shaft 132 to the threaded bore 108 in the pivot arm 104 facilitates the translation of rotational movement of the stem 130 to linear movement of the pivot arm 104. Linear movement of the body 102 causes the clamp arm 106 of the conductor clamp 100 to move toward or away from the conductor channel 28 relative to the body 22 of the first end section 20, or toward or away from the conductor channel 48, seen in FIGS. 23-26, relative to the body 42 of the second end section 40. The tool mounting member 134 may be an eye or looped member for coupling with an extendable reach tool, for example, a hot stick. In another embodiment, the tool mounting member 134 may be configured and dimensioned for hand installation. The collar 136 is used to retain the stem 130 within a pocket 30, seen in FIGS. 21 and 22, in the first end section 20 or in a similar pocket in the second end section 40. With the collar 136 of the stem 130 retained within the pocket 30, the stem 130 is movably coupled to the first end section 20 or the second end section 40. The stem 130 may be made of a metallic material, such as aluminum, cast aluminum, galvanized steel or stainless steel, copper alloy, bronze alloy, silicone-bronze alloy or other combination of metallic materials. In another exemplary embodiment, the stem 130 may be made of a non-metallic material, such as a rigid plastic or composite materials e.g., carbon fiber. Although a stem 130 is shown in the figures, it should be noted that any suitable fastening mechanism or structure between conductor clamp 100 and the end section 20 or 40 may be provided.

Figures 17, 18:
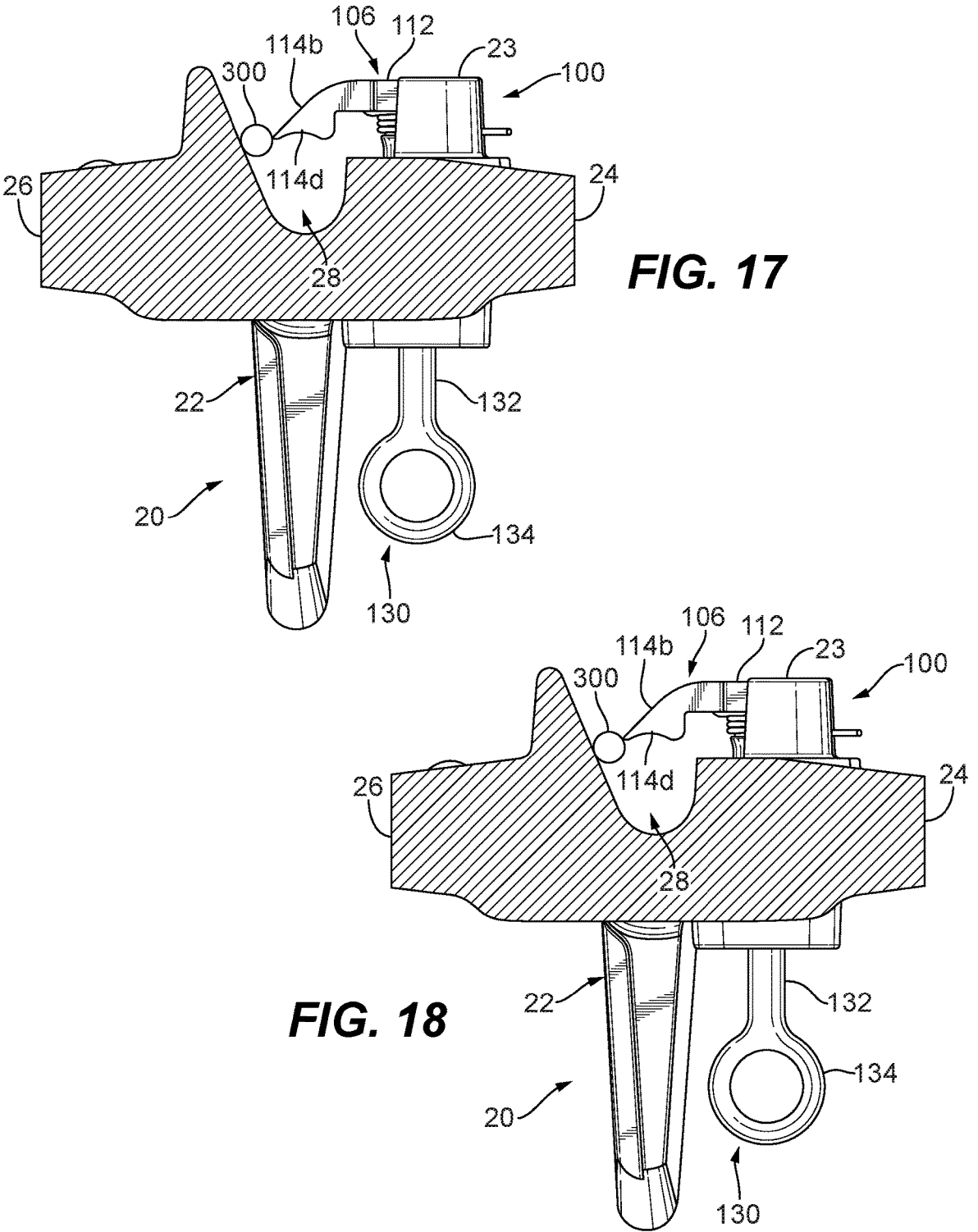
FIGS. 17-22 are cross-sectional views of the in-line power disconnect assembly of FIG. 2, illustrating a small size electrical conductor being captured by and held in place by the conductor clamp according to the present disclosure.
Figures 19, 20:
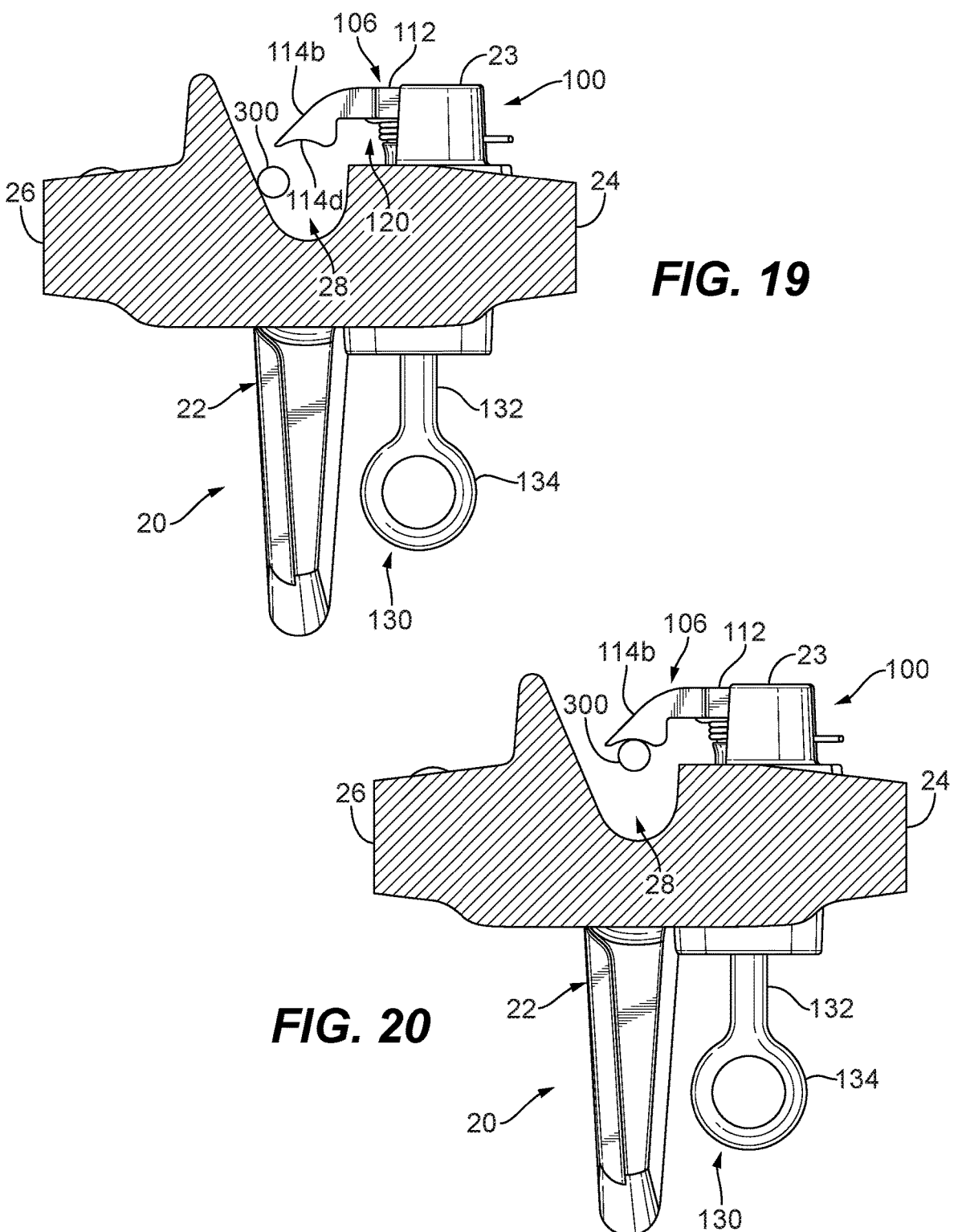
Figures 21, 22:
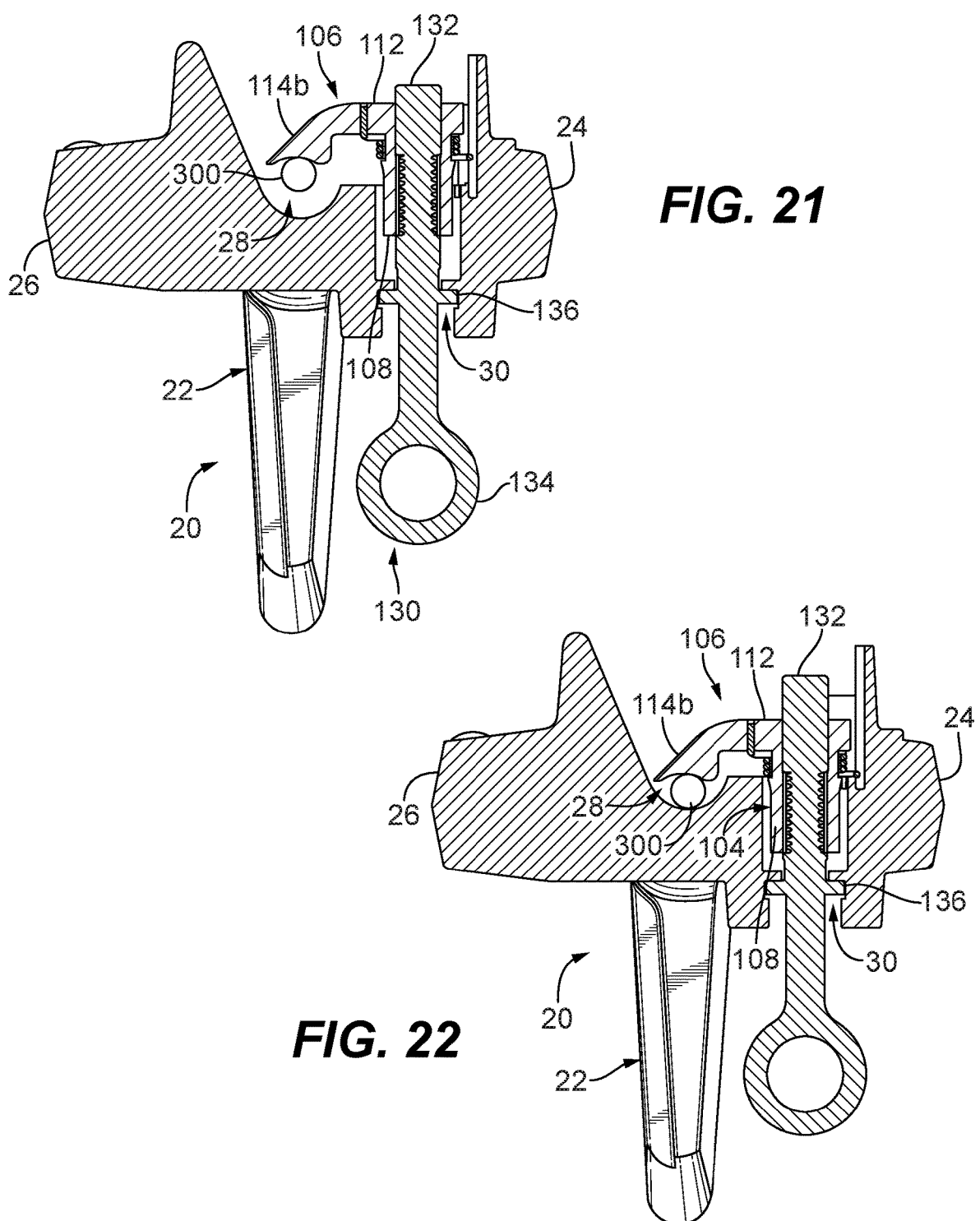

Continuing to refer to FIGS. 1 and 17-22, the attachment of the first end section 20 of the disconnect assembly 10 to a small conductor 300 will be described. Initially, the first end section 20 is elevated toward a conductor 300 extending between utility poles 14, seen in FIG. 1, so that the conductor 300 is positioned in close proximity to the conductor channel 28 in the body 22 and contacting the second portion 114b of the second leg 114, as shown in FIGS. 13 and 17. The first end section 20 is further elevated so that the conductor 300 applies a force on the rounded edge 118 of the second leg 114, seen in FIG. 9, causing the body 102 including the second leg portion 114 to twist, pivot or rotate in the direction of the intermediate section 60 from the clamping position to the open position, as shown in FIG. 18. In the open position, the conductor 300 passes the second portion 114b of the second leg portion 114 and enters the conductor channel 28, as shown in FIG. 19. After the conductor 300 enters the conductor channel 28, the force applied by the conductor 300 on the second portion 114b of the second leg portion 114 is removed. With the force removed, the biasing member 120 automatically biases, e.g., twists, pivots or rotates, the body 102 back to the clamping position. With the conductor 300 in the conductor channel 28 and the body 102, including the second portion 114b, in the clamping position, the conductor 300 is prevented from exiting the conductor channel 28. In addition, the conductor 300 can now be engaged by the conductor engaging surface 114d of the second portion 114b as shown in FIG. 20. The stem 130 is then rotated to move the body 102 of the conductor clamp 100 toward the body 22 of the first end section 20 so that the conductor 300 is moved toward the wall of the conductor channel 28, as shown in FIG. 21. When the stem 130 is tightened, the conductor 300 is clamped between the conductor engaging surface 114d of the second portion 114b and the wall of the conductor channel 28, as shown in FIG. 22. With the conductor 300 mechanically connected to the first end section 20, the same steps are repeated for the second end section 40 to mechanically connect the conductor 300 to the second end section 40. The conductor 300 is then cut at a point between the first end section 20 and the second end section 40 forming the first end conductor and the second end conductor described above. At this point, electrical connections between the conductor 300 and the disconnect assembly 10 can be made at points 22 and 42 of the disconnect assembly using, for example, known mechanical clamps, such as bolted wedge type clamps or friction wedge tap type clamps.

Figures 23, 24:
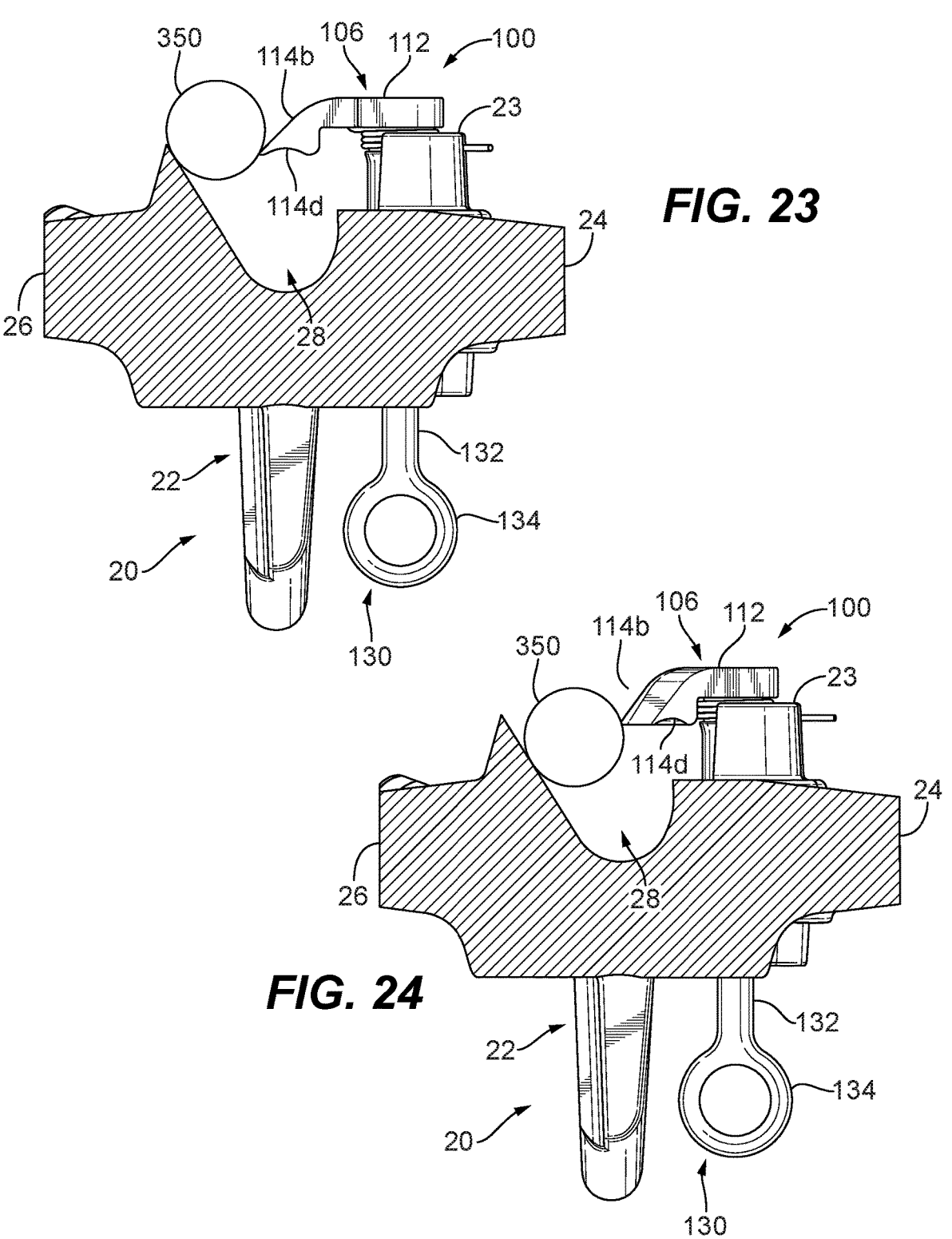
FIGS. 23-28 are cross-sectional views of the in-line power disconnect assembly of FIG. 2, illustrating a large size electrical conductor being captured by and held in place by the conductor clamp according to the present disclosure.
Figures 25, 26:
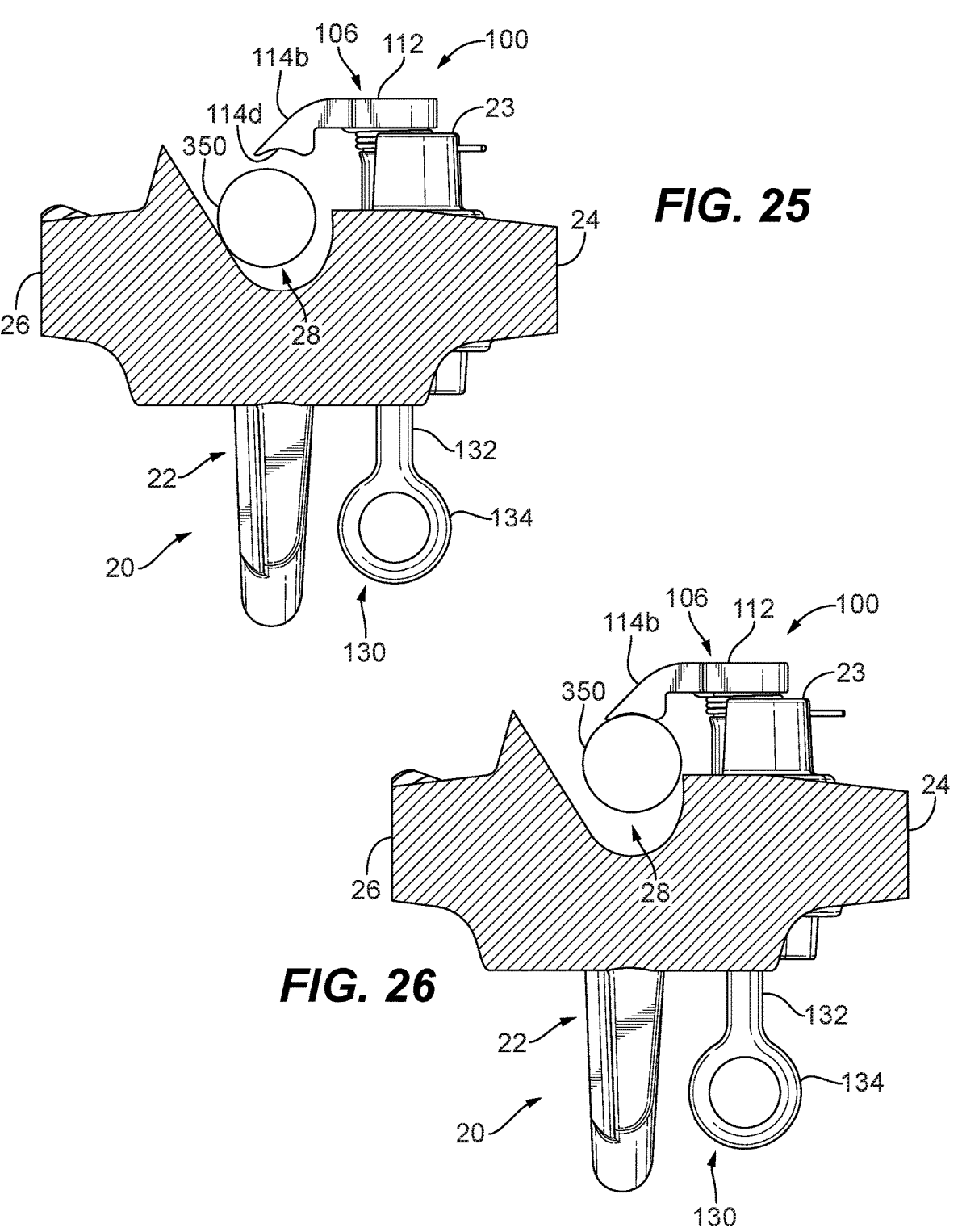
Figures 27, 28:
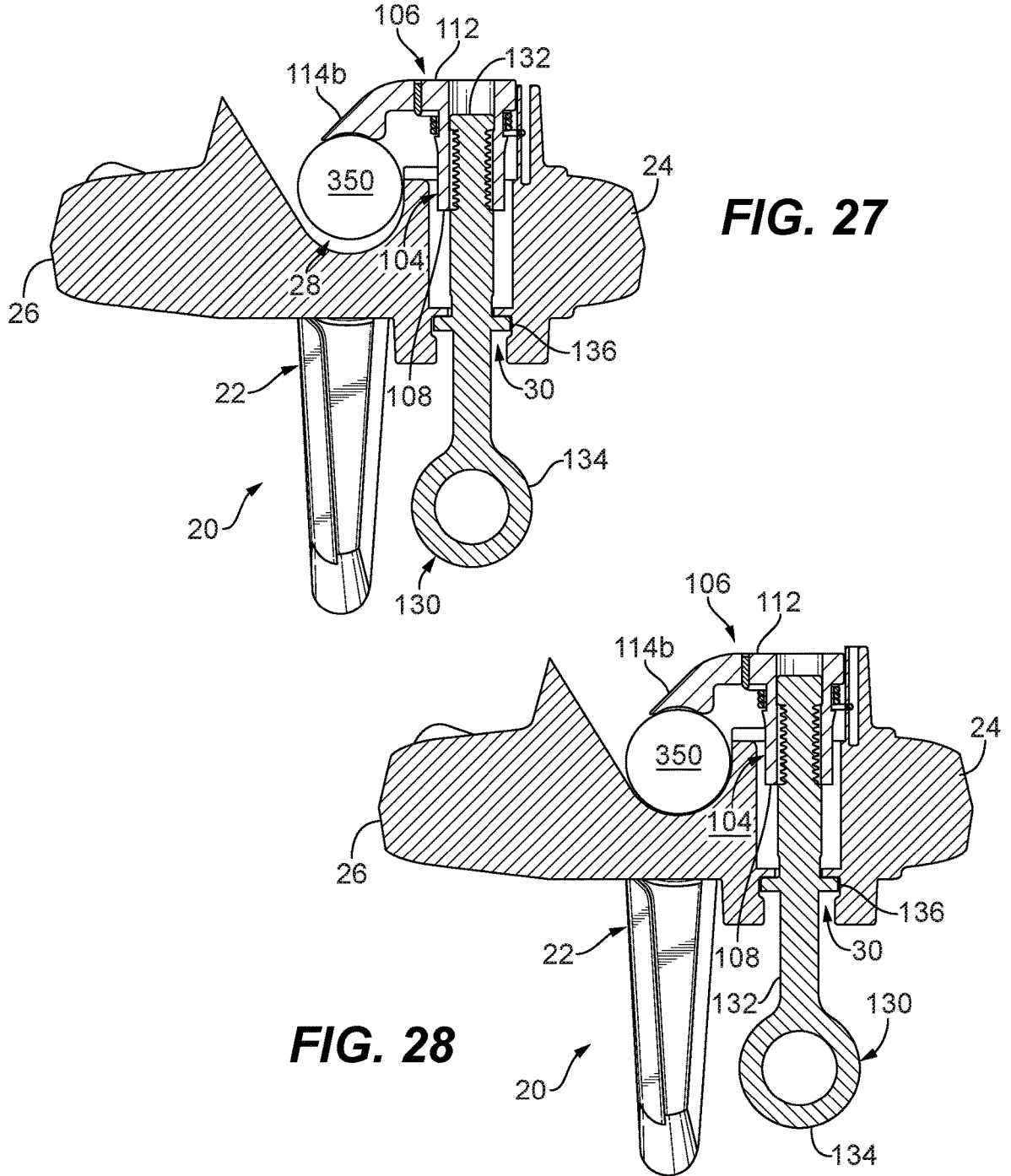

Referring to FIGS. 1 and 23-28, the attachment of the first end section 20 of the disconnect assembly 10 to a large conductor 350 will be described. Initially, the first end section 20 is elevated toward a conductor 350 extending between utility poles 14, seen in FIG. 1, so that the conductor 350 is positioned in close proximity to the conductor channel 48 in the body 22 and contacting the second portion 114b of the second leg 114, as shown in FIG. 23. The first end section 20 is further elevated so that the conductor 350 applies a force on the rounded edge 118 of the second leg 114, seen in FIG. 9, causing the body 102, including the second leg portion 114, to twist, pivot or rotate in the direction of the intermediate section 60 from the clamping position to the open position, as shown in FIG. 24. In the open position, the conductor 350 passes the second portion 114b of the second leg portion 114 and enters the conductor channel 28, as shown in FIG. 25. After the conductor 350 enters the conductor channel 28, the force applied by the conductor on the second portion 114b of the second leg portion 114 is removed. With the force removed, the biasing member 120 automatically biases, e.g., twists, pivots or rotates, the body 102 back to the clamping position. With the conductor 350 in the conductor channel 28 and the body 102, including the second portion 114b, in the clamping position, the conductor 350 is prevented from exiting the conductor channel 28. In addition, the conductor 350 can now be engaged by the conductor engaging surface 114d of the second portion 114b as shown in FIG. 26. The stem 130 is then rotated to move the body 102 of the conductor clamp 100 toward the body 22 of the first end section 20 so that the conductor 350 is moved toward the wall of the conductor channel 28, as shown in FIG. 27. When the stem 130 is tightened, the conductor 350 is clamped between the conductor engaging surface 114d of the second portion 114b and the wall of the conductor channel 28, as shown in FIG. 28. With the conductor 350 mechanically connected to the first end section 20, the same steps are repeated for the second end section 40 to mechanically connect the conductor 350 to the second end section 40. The conductor 350 is then cut at a point between the first end section 20 and the second end section 40 forming the first end conductor and the second end conductor described above. At this point, electrical connections between the conductor 350 and the disconnect assembly 10 can be made at points 22 and 42 of the disconnect assembly using, for example, known mechanical clamps, such as bolted wedge type clamps or friction wedge tap type clamps.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. An electrical disconnect assembly comprising:
a first end section having a first conductor channel and a first conductor clamp that is rotatable between a clamping position and an open position, wherein when the first conductor clamp is in the clamping position a clamp arm of the first conductor clamp is substantially perpendicular to a longitudinal axis of the first end section and a conductor engaging surface of the clamp arm of the first conductor clamp is positioned to engage an electrical conductor within the first conductor channel;
a second end section having a second conductor channel and a second conductor clamp that is rotatable between a clamping position and an open position, wherein when the second conductor clamp is in the clamping position a clamp arm of the second conductor clamp is substantially perpendicular to a longitudinal axis of the second end section and a conductor engaging surface of the clamp arm of the second conductor clamp is positioned to engage an electrical conductor within the second conductor channel; 1
at least one insulator positioned between the first end section and the second end section; and
a switch assembly positioned between the first end section and the second end section, wherein the first conductor clamp comprises,
a body having a pivot arm and the clamp arm of the first conductor clamp coupled to the pivot arm, the pivot arm being a substantially cylindrical member at least where the clamp arm of the first conductor clamp couples to the pivot arm, the clamp arm of the first conductor clamp extends from the pivot arm and includes the conductor engaging surface configured to engage the electrical conductor within the first conductor channel, and
a biasing member coupled to either the pivot arm or the clamp arm of the first conductor clamp and the first side section, the biasing member being configured to normally bias the body of the first conductor clamp to the clamping position.

2. The electrical disconnect assembly according to claim 1, wherein the biasing member comprises a torsion spring.

3. The electrical disconnect assembly according to claim 1, wherein the clamp arm of the first conductor clamp includes a conductor guide configured to move the body of the first conductor clamp from the clamping position to the open position in opposition to the normal biasing force of the biasing member of the first conductor clamp.

4. The electrical disconnect assembly according to claim 3, wherein the conductor guide of the first conductor clamp comprises a camming surface on the clamp arm of the first conductor clamp.

5. The electrical disconnect assembly according to claim 1, wherein the second conductor clamp comprises:
a body having a pivot arm and the clamp arm of the second conductor clamp coupled to the pivot arm, the pivot arm being a substantially cylindrical member at least where the clamp arm of the second conductor clamp couples to the pivot arm, the clamp arm of the second conductor clamp extends from the pivot arm and includes the conductor engaging surface configured to engage the electrical conductor within the second conductor channel; and
a biasing member coupled to either the pivot arm or the clamp arm of the second conductor clamp and the second side section, the biasing member being configured to normally bias the body of the second conductor clamp to the clamping position.

6. The electrical disconnect assembly according to claim 5, wherein the biasing member comprises a torsion spring.

7. The electrical disconnect assembly according to claim 5, wherein the clamp arm of the second conductor clamp includes a conductor guide configured to move the body of the second conductor clamp from the clamping position to the open position in opposition to the normal biasing force of the biasing member of the second conductor clamp.

8. The electrical disconnect assembly according to claim 7, wherein the conductor guide of the second conductor clamp comprises a camming surface on the clamp arm of the second conductor clamp.

9. An electrical disconnect assembly comprising:
a first end section having a first conductor channel;
a first conductor clamp attached to the first end section and rotatably movable between a clamping position and an open position, wherein when the first conductor clamp is in the clamping position a clamp arm of the first conductor clamp is aligned with the first conductor channel so that a conductor engaging surface of the clamp arm of the first conductor clamp is positioned to engage a conductor within the first conductor channel;
a second end section having a second conductor channel;
a second conductor clamp attached to the second end section and rotatably movable between a clamping position and an open position, wherein when the second conductor clamp is in the clamping position a clamp arm of the second conductor clamp is aligned with the second conductor channel so that a second conductor engaging surface of the clamp arm of the second conductor clamp is positioned to engage a conductor within the second conductor channel;
an intermediate section between the first end section and the second end section, the intermediate section including at least one insulator having a first end coupled to the first end section and a second end coupled to the second end section, and a switch assembly having a first end coupled to the first end section and a second end coupled to the second end section, wherein the first conductor clamp comprises,
a body having a pivot arm and the clamp arm of the first conductor clamp coupled to the pivot arm, the pivot arm being a substantially cylindrical member at least where the clamp arm of the first conductor clamp couples to the pivot arm, the clamp arm of the first conductor clamp extends from the pivot arm of the first conductor clamp and includes the conductor engaging surface configured to engage the electrical conductor within the first conductor channel; and a biasing member coupled to either the pivot arm or the clamp arm of the first conductor clamp and the first side section, the biasing member being configured to normally bias the body of the first conductor clamp to the clamping position.

10. The electrical disconnect assembly according to claim 9, wherein the biasing member comprises a torsion spring.

11. The electrical disconnect assembly according to claim 9, wherein the clamp arm of the first conductor clamp includes a conductor guide configured to move the body of the first conductor clamp from the clamping position to the open position in opposition to the normal biasing force of the biasing member of the first conductor clamp.

12. The electrical disconnect assembly according to claim 11, wherein the conductor guide of the first conductor clamp comprises a camming surface on the clamp arm of the first conductor clamp.

13. The electrical disconnect assembly according to claim 9, wherein the second conductor clamp comprises:

a body having a pivot arm and the clamp arm of the second conductor clamp coupled to the pivot arm, the pivot arm being a substantially cylindrical member at least where the clamp arm of the second conductor clamp couples to the pivot arm, the clamp arm of the second conductor clamp extends from the pivot arm and includes the conductor engaging surface configured to engage the electrical conductor within the second conductor channel; and a biasing member coupled to either the pivot arm or the clamp arm of the second conductor clamp and the second side section, the biasing member being configured to normally bias the body of the second conductor clamp to the clamping position.

14. The electrical disconnect assembly according to claim 13, wherein the biasing member comprises a torsion spring.

15. The electrical disconnect assembly according to claim 13, wherein the clamp arm of the second conductor clamp includes a conductor guide configured to move the body of the second conductor clamp from the clamping position to the open position in opposition to the normal biasing force of the biasing member of the second conductor clamp.

16. The electrical disconnect assembly according to claim 15, wherein the conductor guide of the second conductor clamp comprises a camming surface on the clamp arm · of the second conductor clamp.

17. A conductor clamp for releasably attaching an electrical conductor to an electrical disconnect assembly, the conductor clamp comprising:

a body having a pivot arm and the clamp arm coupled to the pivot arm, the pivot arm being a substantially cylindrical member at least where the clamp arm couples to the pivot arm, the clamp arm extends from the pivot arm and includes the conductor engaging surface configured to engage the electrical conductor when the electrical conductor is positioned within a conductor channel of the electrical disconnect assembly; and a biasing member coupled to either the pivot arm or the clamp arm and configured to be coupled to the electrical disconnect assembly so that the biasing member normally bias the body to the clamping position.

18. The electrical disconnect assembly according to claim 17, wherein the biasing member comprises a torsion spring.

19. The electrical disconnect assembly according to claim 17, wherein the clamp arm includes a conductor guide, and wherein when a force is applied to the conductor guide the body moves from the clamping position to the open position in opposition to the normal biasing force of the biasing member.

20. The electrical disconnect assembly according to claim 19, wherein the conductor guide comprises a camming surface on the clamp arm.

* * * * *